Patented Sept. 16, 1947

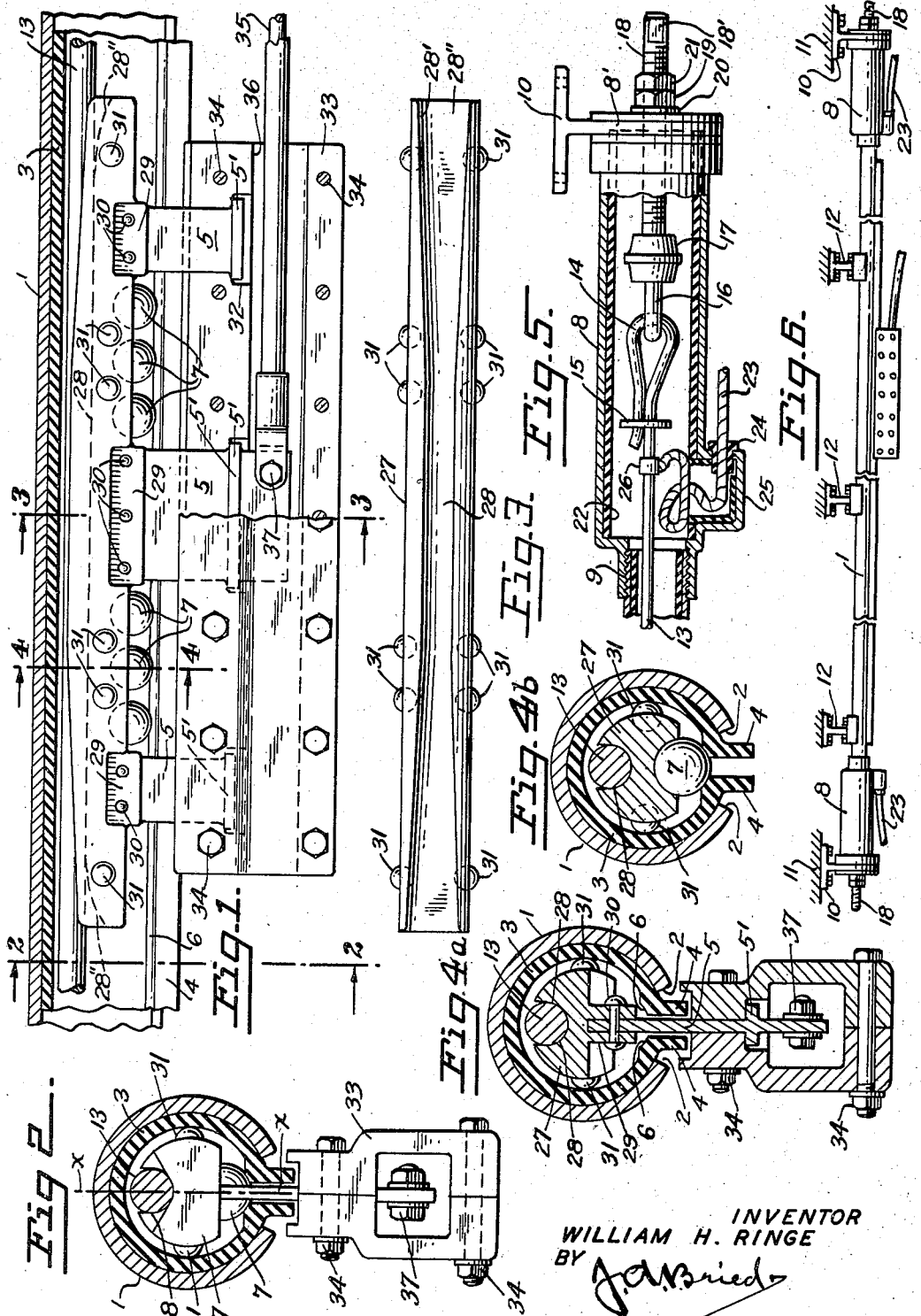

2,427,475

UNITED STATES PATENT OFFICE 2,427,475

TROLLEY AND CONDUCTOR TRACK

William H. Ringe, Berkeley, Calif.

Application August 29, 1945, Serial No. 613,247

4 Claims. (Cl. 191—35)

This invention relates to electric trolleys and trolley conductor tracks and has for its principal object an improved construction of such apparatus particularly adapted to traveling cranes and trolley installations where protection of the trolley wire against accidental contact with outside things is important.

Other features and advantages of the invention will appear in the following description and accompanying drawings.

In the drawings, Fig. 1 is a side elevation of my improved trolley supported in position within its hollow tubular track and with the latter shown in vertical longitudinal section.

Fig. 2 is a cross section of the trolley track taken along the line 2—2 of Fig. 1 and showing one end of the trolley and the relation of the trolley wire thereto.

Fig. 3 is a top view of the trolley showing the contact groove for slidably receiving the trolley wire.

Fig. 4a is a cross section of both trolley and trolley track, and also the trolley wire, is taken along the line 3—3 of Fig. 1. Fig. 4b is a cross section of Fig. 1 taken along the line 4—4 of Fig. 1.

Fig. 5 is a detail of the tensioning mechanism for the trolley wire within an enlarged housing at the end of the hollow trolley track, and with the housing shown partly in longitudinal cross section.

Fig. 6 is a reduced size side view of one of my improved trolley tracks complete as installed, with its trolley in place, the track being broken in length at several places.

It may be stated that the present application represents improvements over the trolley and track shown in my copending patent application filed under Serial No. 597,502, June 4, 1945.

In the present drawings my track comprises a hollow, preferably circular, tube or pipe-like shell 1, preferably of metal though not necessarily so, and which tube is provided with an open slot 2 extending along one side (preferably though lower when in use), and fitting snugly within the shell 1, is another and similar shell 3 of insulating material such as hard rubber, hard fiber, or any of the dielectric plastics, and which is formed with two longitudinally extending flanges or margins 4 extending downwardly through the slot 2 of the outer shell and somewhat beyond the outer shell as shown best in Figs. 2, 3, and 4, and with the margins 4 spaced apart to provide room for the trolley hangers 5.

The insulating tubular lining or sleeve 3 is preferably of a fit within the outer shell 1 which will adapt it to being forced longitudinally into the outer shell, in assembling the parts, and manifestly it may be in relatively short sections if desired.

The inner sleeve 3 is also formed with a pair of shoulders 6 extending the full length and preferably slightly concaved to better function as a ball track or ball race for several tandem arranged balls 7, which support the trolley for movement along the track.

At the ends of the outer shell 1 are enlarged hollow housings 8 preferably of metal screwed over the shell 1, as indicated at 9 in Fig. 5 or otherwise secured thereto, and which housings are preferably provided with suitable lugs or brackets 10 adapted for bolting or otherwise securing to any desired supporting structure 11 and which may be the wall or ceiling frame of a building.

Also, between the supported extreme ends of the track may be additional supports or clamp hangers such as indicated at 12 in Fig. 6 which engage about the outer sides of the outer shell 1 and may of course straddle any joint in the same where the track is of a length requiring several sections.

Within the hollow track is a bare trolley wire 13 positioned above center on the vertical center line X as shown in Fig. 2; and provided at one or both ends with means for tensioning the wire and also for connecting it to an outside source of electric current.

A suitable means for tensioning the trolley wire is shown in Fig. 5 wherein the wire 13 is formed with a centralized loop 14 at its end soldered and/or held in place by a clip 15 and connected by a hook or loop 16 projecting from an insulator 17 from the opposite end of which insulator projects a threaded bolt rod 18 which extends slidably through the outer end wall 8' of the housing and carries a threaded nut 19 bearing against a washer 20 and a check nut 21, for longitudinally adjusting the rod 18, and thereby the tension of the trolley wire. The outer end of the rod 18 may be headed or flattened as at 18' to facilitate holding it with a wrench against turning.

The interior of the housing is preferably lined with a thick insulating sleeve as at 22, and the electric current is supplied to the trolley wire at either or both ends through a suitable flexible conductor 23 which enters the housing through an insulating bushing 24 fitted into an opening in an enlarged portion 25 of the housing and which conductor is freely looped within the housing and soldered at its end to the trolley wire as at 26, all so that the supply conductor 23 can play out as required in tensioning the trolley wire. Obviously the flexible conductor 23 may be insulated or not as may be desired.

The trolley hangers 5 are three in number and preferably of flat bars or plates of copper, spaced apart as indicated to make room between them for the main supporting balls 7 which roll along the insulating track shoulders 6, and the upper halves of which balls are revolvably seated in spherical recesses formed in the underside of the trolley shoe 27.

The trolley shoe 27 is a bar-like section of a good conductive metal formed with a groove 28 in its upper edge to nicely but slidably receive the trolley wire 13 and formed at its lower edge with three pairs of spaced lugs 29 between which the hangers 5 are secured, as by soldering and/or riveting as at 30.

The groove 28 for the wire is preferably (as at 28') widened out towards the ends of the shoe and also slanted downwardly as at 28" to better pick up the wire should it sag unduly. However attention is directed to the fact that preferably the trolley wire 13 is of a diameter so large that even if the wire should break it could not possibly fall through the slot formed by the spaced insulating sleeve margin 4.

Besides the main supporting balls 7 the trolley shoe is preferably guided against lateral movement within the insulating sleeve 3 by a few bearing balls 31 revolvably set in spherical recesses in opposite sides of the shoe as indicated in the drawings to roll against the inner surface of the insulating inner shell 3.

The trolley shoe hangers 5 are preferably formed with laterally extending flanges 5' which fit within recesses 32 formed between two insulating body shells 33 which fit together over and cover opposite sides of all three hangers 5 and are secured tightly together as by bolts 34.

The electric current is conducted from the trolley as by a conductor 35 extending into a central opening 36 formed between the body shells 33 and electrically connected at its inner end as at 37 with the center hanger 5 as indicated.

In operation the trolley is suitably connected to the traveling crane either through means of the conductor 35, or by any suitable yoke or direct connection to the body shell 33, for movement with the crane or other electric propelled vehicle the trolley is intended to supply.

Having thus described my improved trolley and track and the manner of its use, what I claim is:

1. A trolley and track comprising an elongated hollow tubular track body of circular cross section formed of hard insulating material and provided with a continuous open slot extending the length of the track body, a trolley wire extending along within the track body, a trolley shoe of conductive material substantially filling the cross sectional area of the track body formed with an open sided groove slidably embracing the trolley wire and holding it at the wall opposite said slot, said shoe formed with a hanger portion extending through said open slot.

2. In a structure as set out in claim 1, a metal shell in exterior tight relation to said tubular track body and slotted with its edges spaced outwardly from the edges of the body slot.

3. In a structure as set out in claim 1, a plurality of bearing balls revolvably mounted in the outer wall of the shoe and rollable along adjacent inner edges of the track slot in straddling relation thereto.

4. In a structure as set out in claim 1, a plurality of bearing balls revolvably mounted in the outer wall of the shoe and rollable along the adjacent inner edges of the track slot in straddling relation thereto, and a plurality of balls similarly mounted in the shoe arranged to contact the inner side walls of the shoe.

WILLIAM H. RINGE.

REFERENCES CITED

The following references are of record in the file of this patent:

UNITED STATES PATENTS

| Number | Name | Date |
|---|---|---|
| 559,356 | Brandenburg | May 5, 1896 |
| 603,672 | Walkins | May 10, 1898 |
| 1,429,025 | Dunbar et al. | Sept. 12, 1922 |
| 2,129,170 | Frank et al. | Sept. 6, 1938 |
| 2,240,947 | Wilson | May 6, 1941 |
| 2,245,135 | Martin | June 10, 1941 |
| 1,466,893 | Dunbar | Sept. 4, 1923 |
| 446,833 | Hunter | Feb. 17, 1891 |
| 483,761 | Creighton | Oct. 4, 1892 |

FOREIGN PATENTS

| Number | Country | Date |
|---|---|---|
| 398,602 | Great Britain | Sept. 21, 1933 |
| 408,703 | Great Britain | April 19, 1934 |
| 852,146 | France | Jan. 24, 1940 |